United States Patent

[11] 3,561,482

| [72] | Inventor | John F. Taplin |
| | | 15 Sewall St, West Newton, Mass. 02165 |
| [21] | Appl. No. | 838,034 |
| [22] | Filed | June 23, 1969 |
| [45] | Patented | Feb. 9, 1971 |
| | | Continuation of application Ser. No. 597,192, Nov. 7, 1966, now abandoned. |

[54] FAIL-SAFE SERVO-CONTROLLED MIXING VALVE
3 Claims, 2 Drawing Figs.

[52] U.S. Cl. .................................................. 137/625.4,
236/12; 251/282; 137/90
[51] Int. Cl. .................................................. F16k 11/02,
F16k 19/00
[50] Field of Search ......................................... 137/90,
505.18, 625.4, 625.34, 625.35; 251/25, 30,
43—46; 236/12

[56] References Cited

UNITED STATES PATENTS

| 824,658 | 6/1906 | Junggren | 251/30 |
| 1,302,538 | 5/1919 | Gulick | 137/413 |
| 2,449,766 | 9/1948 | Brown | 236/12 |

FOREIGN PATENTS

| 818,042 | 6/1937 | France | 236/12 |

Primary Examiner—Henry T. Klinksiek
Attorney—Erwin Salzer

ABSTRACT: A fluid mixing valve has a nonforce-balanced, or nonpressure-compensated, valve means controlling the flow of a first fluid and a force-balanced, or pressure-compensated, valve means controlling the flow of a second fluid. The thrust to which the first mentioned valve means is subjected by the first fluid and the thrust of a fail-safe biasing means acting in the same direction are balanced by the partition of a fluid servomotor whose effective area exceeds the effective area of the first mentioned valve means and is acted upon by the full pressure of the first fluid.

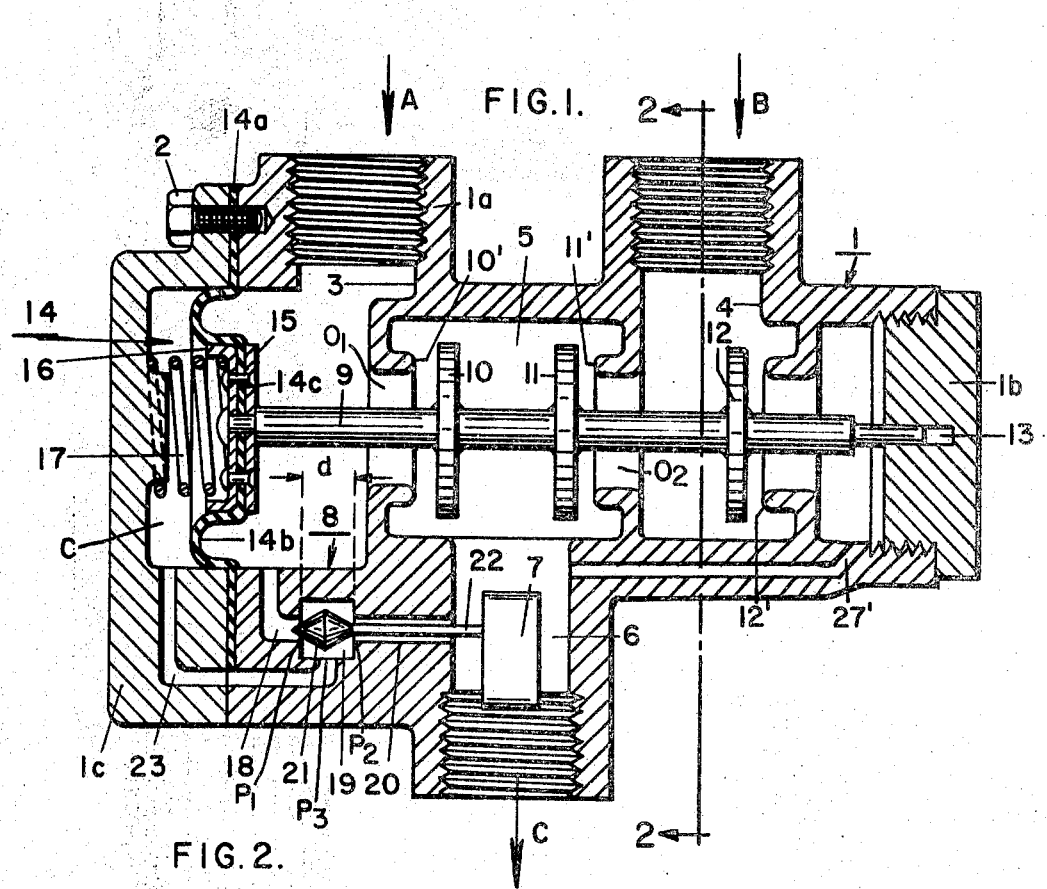
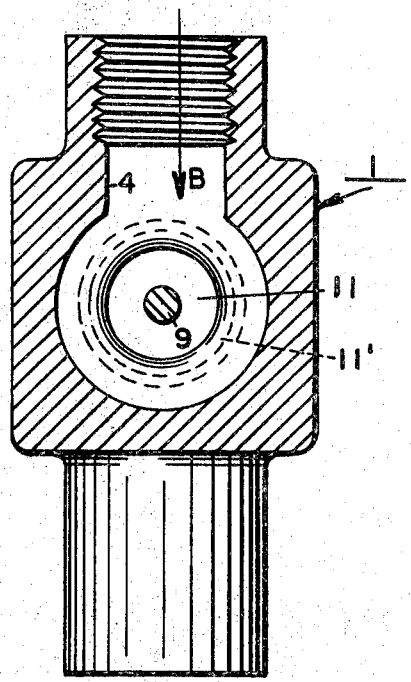

FAIL-SAFE SERVO-CONTROLLED MIXING VALUE

This application is a continuation of application Ser. No. 597,192 filed Nov. 7, 1966, now abandoned.

This invention relates generally to servo-controlled mixing valves for mixing two fluids in accordance with a variable ratio determined by the action of a sensing element.

This invention refers more particularly to mixing valves of the above description which are operated by a servomotor which is supplied with one of the two fluids to be mixed, and operated by the pressure of one of the two fluids to be mixed.

Mixing valves of the aforementioned description are subject to failures conductive to great hazards and dangers.

It is, therefore, one object of this invention to provide fail-safe mixing valves of the aforementioned description, i.e. mixing valves wherein occurrence of failure conditions does not result in great hazards and dangers.

The proper operation of mixing valves of the aforementioned description depends on the presence of a predetermined minimum pressure of the particular fluid, or first fluid, of the two fluids to be mixed which is supplied to, and provides the motive power for, the servomotor. If the pressure of this fluid drops below the aforementioned predetermined minimum value, or virtually to zero, the control signals or control impulses given by the sensing element are no longer effective to control the servomotor operating the mixing valve. The control signals given by the sensing element and transmitted to the servo-valve of the servomotor may require a relative decrease in the mixture of the two fluids of the second fluid, i.e. the fluid not supplied to, and not intended to provide the motive power for, the servomotor, but in the absence of a predetermined minimum pressure of the first fluid energizing the servomotor the latter is incapable of performing the function called for by the condition of the sensing element.

To better illustrate the situation, let us assume that the first fluid, i.e. the fluid supplied to and energizing the servomotor is normally relatively cold, and that the second fluid to be mixed with the first fluid is normally relatively hot, and that the sensing element is a thermostat controlling the servo-valve of the servomotor and hence the mixing-valve-operating servomotor in such a fashion as to maintain a substantially constant temperature of the mixture of the first fluid and the second fluid. If the pressure of the first relatively cold fluid drops below a predetermined minimum value, or virtually to zero, the servomotor does not respond any longer to the control signals or impulses given by the thermostat, and the temperature of the fluid mixture to be made may rise to a dangerous level which may be as high as the temperature of the second relatively hot fluid. This extreme case occurs when the admixture of any of the first relatively cold fluid becomes zero.

It is, therefore, another object of this invention to provide servo-controlled fluid mixing valves of the above description wherein a pressure failure of one of the two fluids to be mixed precludes in the mixture of the two fluids a preponderance of the other of the two fluids, incompatible with the control signals or impulses exerted by the sensing element upon the servo-valve provided for controlling the operation of the mixing-valve-operating servomotor.

As mentioned above, one of the reasons which may preclude the mixing-valve-operating servomotor from performing its proper function is a pressure failure of one of the two fluids to be mixed. Another failure condition which may arise and may result in a danger condition is a failure of the servomotor as such. The servomotor may be, for instance, a rolling diaphragm device and become inoperative if the rolling diaphragm thereof develops a leak. The servomotor may be formed by metal bellows which may likewise develop a leak, and thus become inoperative. The servomotor for operating the mixing valve may be a piston-and-cylinder type fluid motor including an annular fluid seal, such as an O-ring, between the lateral walls of the cylinder and the lateral wall of the piston. Such an annular fluid seal is also subject to failure, i.e. it may allow leakage of fluid from one side of the seal to the other. This type of failures results in a more or less complete equalization of the pressure to both sides of the movable, mixing-valve-operating partition of the servo-fluid motor. Under such conditions the servomotor does not respond any longer to the command given to it by the servo-valve by which it is normally controlled, and does not respond to the control signals, or control impulses, which are transmitted from the sensing element to the servo-valve.

Let us assume again for the purpose of better explaining the situation underlying the present invention that the first fluid to be supplied to the servomotor to energize the same and to supply its motive power is normally relatively cold, and that the second fluid to be admixed to the first fluid is normally relatively hot, and that the sensing element controlling the servo-valve of the servomotor and hence the mixing-valve-operating servomotor is a thermostat whose control function is to maintain a constant temperature of the mixture of the two fluids. If the servomotor fails to obey the control function of the thermostat, the temperature of the fluid mixture may rise to a dangerous level. The latter may be as high as the temperature of the relatively hot fluid without any admixture to it of the first, relatively cold fluid.

It is, therefore, another object of this invention to provide servo-controlled fluid mixing valves of the above description where in a failure of the servomotor, and more particularly a leakage condition therein, precludes in the mixture of the two fluids to be mixed a preponderance of one of them to an extent incompatible with the control function of a sensing element.

For a better understanding of the invention, together with other objects and advantages thereof, reference may be had to the following description, taken in connection with the accompanying drawings, and its scope will be pointed out with particularity in the appended claims.

In the drawings:

FIG. 1 is a longitudinal section of a mixing valve embodying the present invention;

FIG. 2 is a section along 2–2 of FIG. 1.

Referring now to the drawings, and more particularly to FIGS. 1 and 2 thereof, numeral 1 has been applied to generally indicate a passageway-defining casing structure. This casing structure is made up of three parts i.e., the center portion 1a, the plug 1b and cylinder portion 1c. Plug 1b is externally screw threaded and its screw threads engage internal screw threads shown in FIG. 1 in the right end of center portion 1a. Cylinder portion or cap 1c is secured to center portion 1a by means of a plurality of screws 2 of which but one is shown in FIG. 1. Center portion 1a defines a first duct or passageway 3 for admission of a first fluid indicated by arrow A, and further defines a second duct or passageway 4 for admission of a second fluid indicated by arrow B. Reference numeral 5 has been applied to indicate a mixing chamber for fluids A and B likewise defined by center portion 1a. Orifice $o_1$ is arranged between passageway 3 and chamber 5, and orifice $o_2$ is arranged between passageway 4 and chamber 5. Center portion 1a further defines an outlet passageway 6 for the mixture of fluids A and B. Arrow C indicates the flow of the fluid mixture leaving mixing chamber 5. Sensing element 7, e.g. a bimetallic thermostat, or Bourdon tube, is arranged inside of passageway 6 and control a servo-valve generally indicated by reference character 8. Main valve stem 9 supports three poppet valve elements 10, 11, 12. Valve element 10 cooperates with valve seat 10', valve element 11 cooperates with valve seat 11' and valve element 12 cooperates with valve seat 12' to define gaps of varying width, depending upon the position of main valve stem 9 and poppet valve elements 10, 11 and 12. The right end of main valve stem 9, as seen in FIG. 1, is reduced in diameter, and movably supported in a slide-bearing-forming bore 13 provided in plug 1b. Main valve stem 9 is unsupported between the ends thereof.

Reference numeral 14 has been applied to generally indicate a rolling diaphragm type servomotor for operating stem 9 and poppet valve elements 10, 11, 12. Reference character 14a has been applied to indicate the radially outer clamping flange of the rolling diaphragm clamped between parts 1a and 1c, reference numeral 14b has been applied to indicate the substantially U-shaped rolling wall of the rolling diaphragm, and reference numeral 14c has been applied to indicate the radially inner clamping flange of the rolling diaphragm. The latter is sandwiched between a pair of stiff or rigid plates 15, 16, which may be held in place by appropriate fasteners, e.g. rivets. The left end of main valve stem 9, as seen in FIG. 1, is firmly affixed to the sandwich structure 14c, 15, 16. Helical spring 17 rests with one end thereof against sandwich structure 14c, 15, 16 and with the other end thereof against the inner surface of part 1c. As a result, main valve stem 9 and poppet valve elements 10, 11, 12 are spring biased from left to right, as seen in FIG. 1.

Center portion 1a further defines fluid passageway 18, servo-valve chamber or additional chamber 19 and fluid passageway or control duct 20. servo-valve chamber or additional chamber 19 houses servo-valve element 21 which is in the shape of a double cone and thus forms, in effect, two servo-valve elements. The end of passageway or control duct 18 adjacent the left portion of double cone 21 forms a valve seat for controlling jointly with the left portion of double cone 21 the admission of fluid A from passageway 3 to servo-valve or additional chamber 19. The right portion of double cone-shaped servo-valve element 21 cooperates with the left end of passageway or control duct 20 to form a gap of varying size for releasing fluid under pressure from servo-valve chamber or additional chamber 19 into passageway 6, the latter being a zone of relatively low pressure. Valve element 21 is supported by a servo-valve stem 22 arranged in fluid passageway or control duct 20 and operable in directions longitudinally thereof by sensing element or thermostat 7. Passageway or control duct 23 interconnects servo-valve chamber or additional chamber 19 and the cylindrical space or servo-cylinder chamber situated to the left of rolling diaphragm 14a, 14b, 14c, as see in FIG. 1. One portion of passageway or control duct 23 is defined by part 1a, and another portion of passageway or control duct 23 is defined by part 1c.

Valve element 10 and valve seat 10' form a first valve means for the controlled admission of fluid A from passageway 3 to mixing chamber 5. Valve elements 11, 12 and valve seats 11', 12' form a second valve means for the controlled admission of fluid B from passageway 4 to mixing chamber 5. The diameters of poppet valve elements 11, 12 and the diameters of valve seats 11', 12' are equal. The forces of fluid B on poppet valve elements 11, 12 are opposite and equal. In other words, the valve means for admission of fluid from passageway 4 to mixing chamber 5 is a substantially force balanced dual element valve. This is not true of the valve means formed by poppet valve element 10 and valve seat 10'. These parts do not form a substantially balanced valve means which is substantially in an equilibrium condition in regard to axial forces. The pressure of fluid A biases valve element 10 from left Valve means 10, 10' increase the admission of fluid A from passageway 3 to chamber 5 when valve element 10 is moved from left to right, as seen in FIG. 1, and decrease the admission of fluid A from passageway 3 to chamber 5 when valve element 10 is moved from right to left. The action of valve means 11, 11' and 12, 12' is opposite to that of valve means 10, 10' in the sense that when valve elements 11, 12 are moved from left to right, as seen in FIG. 1, the admission of fluid B from passageway 4 to mixing chamber 5 is decreased, and the ratio of fluid A to fluid B is decreased, when valve elements 11, 12 are moved from right to left.

Valve elements 10, 11, 12 remain in any given position when the sum total of all the forces acting on stem 9 in a direction longitudinally thereof is zero.

Assuming fluid A to be relatively cold, and fluid B relatively hot, and assuming that sensing element 7 is a thermostat whose function it is to maintain the temperature of mixture C of fluids A and B substantially constant.

If the temperature of mixture C in passageway 6 drops below a predetermined temperature, thermostat 7 moves servo-valve stem 22 of servo-valve element 21 from right to left, as seen in FIG. 1. As a result, the effective area of passageway or control duct 18 is decreased and the effective area of passageway 20 increased. This, in turn, results in an increase of the ratio of fluid pressure on the right side of rolling diaphragm 14a, 14b, 14c to the fluid pressure on the left side of rolling diaphragm 14a, 14b, 14c. Hence main valve stem 9 is being moved from right to left, as seen in FIG. 1, until a new equilibrium position has been established wherein the ratio of relatively hot fluid B to relatively cold fluid is larger than before the above change.

The reverse action occurs if the mixture C of fluids A and B increases above and beyond a predetermined temperature. Then thermostat 7 moves servo-stem 22 of servo-valve element 21 from left to right, as see in FIG. 1. As a result, the effective cross-sectional area of passageway or control duct 18 is increased, and the effective cross-sectional area of passageway or control duct 20 is decreased. This, in turn, results in a decrease of the ratio of the fluid pressure on the right side of rolling diaphragms 14a, 14b, 14c to the fluid pressure on the left side of rolling diaphragms 14a, 14b, 14c. Consequently, main valve stem 9 is moved by sandwich structure 14c, 15, 16 from left to right until a new equilibrium condition is established wherein the ratio of relatively hot fluid B to relatively cold fluid A is smaller than before the above change.

It is apparent from the foregoing that the mixing valve operates as a negative feedback loop tending to maintain a constant output condition under varying input conditions.

Assuming now that the pressure of fluid A drops below a predetermined minimum valve, or to zero. This causes malfunction of servomotor 14 or renders servomotor 14 entirely inoperative. Under such conditions thermostat 7 may actuate the servo-valve 8, or the servo-valve element 21 thereof in the desired sense, but the servomotor 14 is not capable of performing the function that is required for lack of energization thereof. This may result in prior art devices of the instant description in dangerous excess temperatures of the fluid mixture C in chamber 5 and passageway 6. This potential danger is eliminated in the structure shown in FIG. 1 by the presence of biasing spring 17. If the pressure of fluid A decreases below a predetermined minimum value, biasing spring 17 tends to reduce the supply of fluid B and to increase the supply of fluid A. Assuming that the pressure of fluid A drops virtually to zero, this causes spring 17 to move stem 9 and poppet valve elements 11, 12 to the right limit position thereof, thus completely cutting off the supply of fluid B from chamber 5.

Assuming now that the pressure of fluid A does not drop below a predetermined critical minimum valve, but that a leak develops in the rolling wall 14b of rolling diaphragm 14a, 14b, 14c, resulting in equalization of the pressure prevailing to both sides of the rolling diaphragm 14a, 14b, 14c. In prior art devices of the instant description such a failure of the servomotor may result in extremely hazardous, or dangerous, condition such as, for instance, the release of a fluid mixture from passageway 6 whose temperature is dangerously high. This danger is avoided in the structure of FIG. 1 by the presence of biasing spring 17 which moves stem 9 and poppet valve elements 10, 11, 12 to the right limit position thereof, or to the fully closed positions of valve elements 11, 12 when the pressure to both sides of rolling diaphragm 14a, 14b, 14c is equalized, thus completely cutting off the supply of fluid B from mixing chamber 5 and outlet passageway 6.

It will be apparent from the above that the spacing $d$ between servo orifices $p_1$ and $p_2$ formed between chamber 19 and control ducts 18 and 20, respectively, differs, or exceeds, the spacing between servo-element means 21. In other words the spacing between the fluid-flow-controlling surfaces of servo-element means 21 is less than the orifice spacing $d$ so to make it possible to move servo-valve stem 22 in a direction longitudinally thereof to thereby vary inversely the effective areas of orifices $p_1$, $p_2$. Reference character $p_3$ has been applied to indicate the additional orifice formed between chamber 19 and control duct 23. Control ducts 18 and 23 are substantially L-shaped. Control duct 20 extends at right angles to one of the legs of L-shaped ducts 18, 23. Ducts 18 and 23 form a first control duct and ducts 23 20 form a second control duct. These two control ducts 18, 23 and 23, 20 have a common portion 23 and separate portions 18, 23.

In all of the embodiments of the invention described and illustrated, the first valve means including movable valve element 10 and fixed valve seat 10' is an unbalanced valve, or nonforced balanced valve. Valve seat 10' has a predetermined effective area determined by the diameter thereof and determining the force of fluid A upon valve element 10. The effective area of the partition means of fluid servomotor 14, i.e. the effective area of the rolling wall 14b of rolling diaphragm 14a, 14b, 14c plus the effective area of plate 15 or 16, respectively, is considerably larger than the effective area of valve seat 10'. This makes it readily possible for servomotor 14 to overcome the pressure of fluid A upon the nonforce balanced first valve means 10, 10' which is always directed from left to right, as seen in FIG. 1.

The structures in FIGS. 1 and 2 define spaces situated to the left of plugs plug 1b. When the valve element 12 moves toward the left and away from its corresponding seat 12', there will be a flow of fluid or gas from left to right through this valve opening. In order to prevent a pressure buildup on the right hand side of the valve element 12 a conduit designated as 27' provides for the flow of this fluid or gas into the outlet conduit 6.

It is apparent from FIG. 1 that the right side of the cylinder of the servomotor 14 communicates directly with passageway 3 by a nonrestricted port thus subjecting the right side of rolling diaphragm 14a, 14b, 14c to the full pressure of fluid A prevailing in passageway 3. Since the effective area of rolling diaphragm 14a, 14b, 14c must be much larger than the effective area of valve means 10, 10', the cross-sectional area of the inner surface of the cylinder of the fluid servomotor 14 must be much larger than the effective area of valve means 10, 10'. While the pressure on one side of the rolling diaphragm partition 14a, 14b, 14c is the full supply pressure of fluid A, servo-valve 8 is capable of varying the pressure on the other side of rolling diaphragm 14a, 14b, 14c from full supply pressure in passage 3 down to the pressure prevailing in passageway 6 which is quite low. Thus the pressure range available for operating fluid servomotor 14 is particularly large.

I claim:

1. A fail-safe servo-controlled mixing valve for mixing two fluids in accordance with a variable determined by the action of a sensing element including in combination:
    a. a casing structure 1 defining a first passageway 3 for a first fluid A a second passageway 4 for a second fluid B, a mixing chamber 5 for mixing said first fluid A and said second fluid B, a first orifice $o_1$ between said first passageway 3 and said mixing chamber 5, a second orifice $o_2$ between said second passageway 4 and said mixing chamber 5, and said casing structure further defining a third passageway 6 forming an outlet from said mixing chamber;
    b. a servo fluid motor 14 including a movable partition 14a, 14b, 14c, 15 arranged inside said casing structure 1 and separating said first passageway 3 from a servomotor cylinder chamber c adapted to be maintained at pressure levels different from the pressure prevailing in said first passageway 3, said partition 14a, 14b, 14c, 15 having a predetermined effective area exposed to the pressure of said first fluid A in said first passageway 3,
    c. spring means 17 in said servomotor cylinder chamber biasing said partition 14a, 14b, 14c, 15 in a direction opposite to the direction of the pressure of said first fluid A inside said first passageway 3 upon said partition 14a, 14b, 14c, 15;
    d. a main valve stem 9 having one end fixedly attached to said partition 14a, 14b, 14c, 15 and operable in a direction longitudinally thereof by said partition 14a, 14b, 4c, 15 and having another end remote from said partition 14a, 14b, 14c, 15, said main valve stem 9 being unsupported between said one end and said another end thereof;
    e. a first valve element 10 fixedly mounted on said main valve stem 9 controlling the flow of said first fluid A through said first orifice $o_1$ into said mixing chamber 5 and being acted upon by the pressure of said first fluid A in said first passageway 3 in the same direction as the action of said spring means 17 upon said partition 14a, 14b, 14c, 15;
    f. a second valve element 11 fixedly mounted on said main valve stem 9 controlling the flow of said second fluid B through said second orifice $o_2$ into said mixing chamber 5 and being acted upon by the pressure of said second fluid B in said second passageway 4 in a direction opposite to the action of said spring means 17 upon said partition 14a, 14b, 14c, 15;
    g. balancing means 12 for said second vale element 11 fixedly mounted on said main valve stem 9 arranged in said second passageway 4 and acted upon by the pressure of said second fluid B in the same direction as the action of said spring means 17 upon said partition 14a, 14b, 14c, 15;
    h. means defining a first control duct 18, 23 communicating between said first passageway 3 and said servomotor cylinder chamber c, said first control duct-defining means 18, 23 having a first valve-element-controlled servo orifice $p_1$ arranged between the ends thereof;
    i. means defining a second control duct 23, 20 communicating between said servomotor cylinder chamber c and said third passageway 6, said second control duct defining means 23, 20 having a second valve-element-controlled servo orifice $p_2$ arranged between the ends thereof and in registry with said first servo orifice $p_1$ and having a predetermined spacing from said first servo orifice $p_1$;
    j. a sensing-element-controlled servo-valve stem 22 movable in a direction longitudinally thereof and arranged in registry with said first servo orifice $p_1$ and said second servo orifice $p_2$; and
    k. servo-valve element means 21 on said servo-valve stem 22 having a spacing different from said predetermined spacing between said first servo orifice $p_1$ and said second servo orifice $p_2$ for varying inversely the effective area of said first servo orifice $p_1$ and said second servo orifice $p_2$ for varying inversely the effective area of said first servo orifice $p_1$ and of said second servo orifice $p_2$ upon movement of said servo-valve stem 22 in a direction longitudinally thereof.

2. A valve as specified in claim 1 wherein:
    a. said casing structure 1 defines an additional chamber 19 housing said servo-valve element means 21;
    b. said first control duct 18, 23 and said second control duct 23, 20 being both defined by said casing structure 1, said first control duct 18, 23 and said second control duct 23, 20 having a common portion 23 and separate portions 18, 20, said common portion 23 of said first control duct 18, 23 and of said second control duct 23, 20 extending from said servomotor cylinder chamber to said additional chamber 19;
    c. said separate portions 18, 20 of said first control duct 18, 23 and of said second control duct 23, 20 forming said first servo orifice $p_1$ and said second servo orifice $p_2$ at opposite sides of said additional chamber 19; and wherein
    d. said common portion 23 of said first control duct 18, 23 and of said second control duct 23, 20 form an additional orifice $p_3$ situated at another side of said additional chamber 19 than said first servo orifice $p_1$ and said second servo orifice $p_2$ and at a point situated between said first servo orifice $p_1$ and said second servo orifice $p_2$.

3. A valve as specified in claim 2 wherein:
    a. said common portion 23 of said first control duct 18, 23 and of said second control duct 23, 20 and one 18 of said separate portions 18, 20 of said first control duct 18, 23 and said second control duct 23, 20 are substantially L-shaped and extend in substantially parallel directions;

b. the other 20 of said separate portions of said first control duct 18, 23 and said second control duct 23, 20 extends substantially at right angles to one leg of said common portion 23 of said first control duct 18, 20 and of said second control duct 23, 20; and wherein c. said servo-valve stem 22 is arranged inside of said other 20 of said separate portions of said first control duct 18, 23 and said second control duct 23, 20.